United States Patent
Guo et al.

(10) Patent No.: US 10,971,709 B2
(45) Date of Patent: Apr. 6, 2021

(54) BATTERY ELECTRODE PLATE REINFORCEMENT MAT HAVING IMPROVED WETTABILITY CHARACTERISTICS AND METHODS OF USE THEREFOR

(71) Applicant: JOHNS MANVILLE, Denver, CO (US)

(72) Inventors: Zhihua Guo, Centennial, CO (US); Souvik Nandi, Highlands Ranch, CO (US); Jawed Asrar, Englewood, CO (US); Albert G Dietz, III, Davidson, NC (US)

(73) Assignee: Johns Manville, Denver, CO (US)

( * ) Notice: Subject to any disclaimer, the term of this patent is extended or adjusted under 35 U.S.C. 154(b) by 246 days.

(21) Appl. No.: 16/049,988

(22) Filed: Jul. 31, 2018

(65) Prior Publication Data

US 2018/0337380 A1    Nov. 22, 2018

Related U.S. Application Data

(62) Division of application No. 14/048,771, filed on Oct. 8, 2013, now Pat. No. 10,062,887.

(51) Int. Cl.
*H01M 2/16*    (2006.01)
*H01M 2/14*    (2006.01)
(Continued)

(52) U.S. Cl.
CPC ......... *H01M 2/1613* (2013.01); *H01M 2/145* (2013.01); *H01M 2/1633* (2013.01);
(Continued)

(58) Field of Classification Search
CPC .................................................. H01M 2/1613
See application file for complete search history.

(56) References Cited

U.S. PATENT DOCUMENTS 5,240,468 A * 8/1993 Willmann ............ H01M 2/1613
29/623.5
5,270,136 A  12/1993 Noland
(Continued)

FOREIGN PATENT DOCUMENTS

EP    2 390 947 A1    11/2011
GB    824 025 A      11/1959
(Continued)

OTHER PUBLICATIONS

Catherine Joly, Robert Gauthier, and Marielle Escoubes, Partial Masking of Cellulosic fiber Hydrophilicity for Composite Applications. Water Sorption by Chemically Modified Fibers, Journal of Applied Polymer Science, vol. 71, 57-69 (1996).

*Primary Examiner* — Brian R Ohara
(74) *Attorney, Agent, or Firm* — Robert D. Touslee (57) ABSTRACT

According to one embodiment, a nonwoven fiber mat for reinforcing a plate or electrode of a lead-acid battery includes a plurality of glass fibers and an acid resistant binder that couples the plurality of glass fibers together. The nonwoven fiber mat also includes a wetting component that is applied to the glass fibers and/or nonwoven fiber mat to increase the wettability of the nonwoven fiber mat such that the nonwoven fiber mat exhibits an average water wick height of at least 0.5 cm after exposure to water for 10 minutes conducted according to method ISO8787. The wetting component may be dissolvable in an acid solution of the lead-acid battery such that a significant portion of the nonwoven fiber mat is lost due to dissolving of the wetting component.

9 Claims, 3 Drawing Sheets

(51) Int. Cl.
 *H01M 10/06* (2006.01)
 *H01M 10/12* (2006.01)

(52) U.S. Cl.
 CPC ....... *H01M 2/1653* (2013.01); *H01M 2/1673* (2013.01); *H01M 10/06* (2013.01); *H01M 10/12* (2013.01); *H01M 2/162* (2013.01); *H01M 2/1626* (2013.01); *Y02T 10/70* (2013.01)

(56) References Cited

U.S. PATENT DOCUMENTS

| | | |
|---|---|---|
| 10,062,887 B2 | 8/2018 | Guo et al. |
| 2002/0142226 A1* | 10/2002 | Zguris ................. H01M 10/121 429/247 |
| 2003/0008214 A1 | 1/2003 | Zguris |
| 2003/0087982 A1* | 5/2003 | Kanazawa ............ H01M 2/162 522/49 |
| 2005/0037264 A1 | 2/2005 | Nakamura |
| 2011/0293988 A1* | 12/2011 | Obernyer ................. H01M 4/62 429/144 |
| 2011/0318643 A1* | 12/2011 | Clement ................. H01M 4/20 429/247 |

FOREIGN PATENT DOCUMENTS

| | | |
|---|---|---|
| JP | H03 43966 A | 2/1991 |
| WO | 1998 000875 A1 | 1/1998 |
| WO | 2011 019597 A1 | 2/2011 |
| WO | 2012 175269 A2 | 12/2012 |

\* cited by examiner

BATTERY ELECTRODE PLATE REINFORCEMENT MAT HAVING IMPROVED WETTABILITY CHARACTERISTICS AND METHODS OF USE THEREFOR

CROSS-REFERENCE TO RELATED APPLICATIONS

This application is a division of pending U.S. patent application Ser. No. 14/048,771 filed Oct. 8, 2013.

BACKGROUND OF THE INVENTION

Lead-acid batteries are characterized as being inexpensive and highly reliable. Therefore, they are widely used as an electrical power source for starting motor vehicles or golf carts and other electric vehicles. Paper is commonly used as a means to improve the manufacturing process for applying lead oxide or lead paste to the grid of a lead-acid battery plate. A conventional pasting paper is made of fibers that will be disintegrated over time by the sulfuric acid. This may lead to the formation of a gap between the lead plates or the lead plate and the separator that might cause erosion of the lead plate, in particular due to friction, thereby gradually deteriorating the performance of the battery. Improved methods of manufacturing lead-acid battery plates are desired.

BRIEF SUMMARY OF THE INVENTION

The embodiments described herein provide battery plate or electrode reinforcement mats having increased wettability properties or capabilities. Such mats may aid in drying of the plate/electrode after the plate/electrode is pasted with a lead paste slurry. In addition, the integrity or strength of such mats is sufficient to support the plate/electrode after assembly of the plate/electrode with a battery and during usage of the battery. As such, the mats described herein aid in both manufacturing of the plate/electrode and in reinforcing the plate/electrode.

According to one embodiment, a nonwoven fiber mat for reinforcing a plate or electrode of a lead-acid battery is provided. The nonwoven fiber mat (also referred to herein as a reinforcement mat) includes a plurality of glass fibers that may be either coarse fibers (e.g., fibers having a diameter between about 6-30 μm or 8-30 μm), microfibers (e.g., fibers having a diameter between about 0.01-5 μm), or a combination of coarse and microfibers. The nonwoven fiber mat also includes an acid resistant binder that couples the plurality of glass fibers together to form the mat. The nonwoven fiber mat further includes a wetting component that is applied to nonwoven fiber mat to increase the wettability/wickability of the nonwoven fiber mat. The wettability/wickability of the nonwoven fiber mat may be increased such that the nonwoven fiber mat has or exhibits an average water wick height and/or water/acid solution wick height of at least 0.5 cm after exposure to water and/or the water/acid solution for 10 minutes in accordance with a test conducted according to method ISO8787. The wetting component may be dissolvable in an acid solution such that a significant portion of the nonwoven fiber mat is lost due to dissolving of the wetting component.

According to another embodiment, a method of manufacturing a nonwoven fiber mat for reinforcing a plate or electrode of a lead-acid battery is provided. According to the method, a plurality of glass fibers may be provided. The glass fibers may be coarse fibers, microfibers, or a combination of coarse and microfibers. An acid resistant binder may be applied to the plurality of glass fibers to couple the plurality of glass fibers together to form the nonwoven fiber mat. A wetting component may be added to the glass fibers and/or nonwoven fiber mat to increase the wettability/wickability of the nonwoven fiber mat. The wettability/wickability of the nonwoven fiber mat may be increased such that the nonwoven fiber mat has or exhibits an average water wick height and/or average water/acid solution wick height of at least 0.5 cm after exposure to the respective solution for 10 minutes in accordance with the test conducted according to method ISO8787.

According to another embodiment, an Absorptive Glass Mat (AGM) lead-acid battery is provided. The AGM battery includes a positive plate or electrode, a negative plate or electrode, a glass fiber mat separator that is disposed between the positive plate and the negative plate to electrically insulate the positive and negative plates, and an electrolyte that is absorbed within the glass fiber mat separator. A nonwoven fiber mat is positioned adjacent either or both the positive plate or the negative plate so as to reinforce the positive plate or the negative plate. The nonwoven fiber mat includes a plurality of glass fibers and an acid resistant binder that couples the plurality of glass fibers together to form the nonwoven fiber mat. The nonwoven fiber mat also includes a wetting component that is applied to the nonwoven fiber mat to increase the wettability of the nonwoven fiber mat. The wettability/wickability of the nonwoven fiber mat may be increased such that the nonwoven fiber mat has or exhibits an average water wick height and/or average water/acid solution wick height of at least 0.5 cm after exposure to the respective solution for 10 minutes in accordance with the test conducted according to method ISO8787.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide battery plate or electrode reinforcement mats having increased wettability properties or capabilities. The term "wettability" as used herein refers to the mats ability to wick or otherwise transport water and/or other solutions, such as a water and acid solution, from a location. For example, in testing the wettability or wickability of glass fiber mats, a strip of the mat, which is often about 1 inch in width, 6 inches long, and typically 0.1-3 mm thick, may be dipped vertically in water or another solution for a given amount of time, such as 10 minutes. The distance or height the water absorbs within the glass fiber mat from a surface of the water or other solution indicates the mat's ability to wick or otherwise transport the water or solution.

Conventional glass mats that are used to reinforce electrodes of a flooded lead-acid battery are often made of relatively coarse fibers having fiber diameters that range between about 5 and 30 µm. These coarse glass fiber mats often are not very wettable, such that when subjected to the test above, the coarse glass fiber mats exhibit water absorption to a distance or height of close to zero. The reinforcement mats described herein (hereinafter reinforcement mats or nonwoven fiber mats) are significantly more wettable than convention glass fiber reinforcement mats.

The reinforcement mats may be used for virtually any type of lead-acid battery including flooded lead-acid batteries and Absorptive Glass Mat (AGM) lead-acid batteries. The mats may find a particular usefulness in AGM batteries due to the method in which the AGM electrodes or plates are manufactured. In manufacturing AGM electrodes a lead paste slurry is applied to a lead grid. The lead paste slurry contains water and/or a water/acid solution (e.g., between about 15-65% by weight sulfuric acid). A glass fiber mat may then be applied over the lead paste slurry and lead grid to reinforce the electrode. After the application of the lead paste slurry and glass fiber mat, the electrode is typically dried to remove most of the water and/or water/acid solution. If an insufficient amount of water and/or water/acid solution is removed from the electrode (i.e., the electrode contains too much water and/or water/acid solution) the electrode may not function to its full capacity in the AGM battery and/or increase the internal resistance of the battery.

Because conventional coarse glass fiber mats that are used for reinforcing electrodes are essentially non-wettable, or have negligible wettability, these mats do not aid in the process or drying the electrode to remove the water and/or water/acid solution. One problem with such mats is that they are not very porous, which restricts the water and/or water/acid solution of the lead paste slurry from coming to the mat's surface where it can evaporate. As such, these conventional glass fiber mats in essence trap the water and/or water/acid solution within the electrode, which may result in an insufficient amount of water and/or water/acid solution being removed from the electrode. In AGM battery applications, these non-wettable glass mats may also separate the electrode from the electrolyte that is absorbed within the battery separator.

The reinforcement mats described herein increase the wettability of glass fiber mats by adding a wetting component to the glass fiber mats. The added wetting component provides an avenue for the water and/or water/acid solution to evaporate. In one embodiment, the added wetting component aids in the transport of water and/or water/acid solution to a surface of the mat where the water and/or water/acid solution may evaporate. In some embodiments, the added wetting component may be dissolvable by the acid in the solution such that a significant amount of the mat's mass is lost after the added wetting component dissolves. For example, in some embodiments the mat may lose between about 15 and 85% of the mat's mass after the added wetting component dissolves. The mat may be configured to reinforce the electrode even after the added wetting component is dissolved and the mat's mass is decreased.

In one embodiment, the added wetting component may be a wettable component of an acid resistant binder that is used to bond the glass fibers of the reinforcement mat together. The wettable component may be a hydrophilic functional group that increases the ability of the water and/or water/acid solution to absorb within the glass reinforcement mat or flow along a surface of the glass reinforcement mat. In other embodiments, wettable component may be a hydrophilic binder that is blended or combined with the acid resistant binder to form a binder mixture. The hydrophilic binder may be dissolvable in an acid solution. In some embodiments, the wettable component may include starch, cellulose, a hydrophilic binder (e.g., a poly acrylic acid based binder) and the like. The wettable component may dissolve in the acid solution of a battery electrode, which results in a glass mat and acid resistant binder upon dissolving of the wettable component. In some embodiments, the glass reinforcement mat may include only coarse glass fibers, or fibers having a fiber diameter of between about 8 and 30 µm. The wettable component may increase such mat's ability to absorb the water and/or water/acid solution and/or allow the water and/or water/acid solution to flow essentially along a surface of the reinforcement mat.

As used herein, the term hydrophilic (or acidophilic) binder refers to a binder having a contact angle with water (or a 33 wt. % sulfuric acid medium for acidophilic) of less than about 90°, preferably less than 70°, and most preferably less than 50°. In testing the contact angle of the binder, the binder may be spin-coated on a glass slide and then cured before being exposed to the above solution to measure the contact angle.

In other embodiments, the glass reinforcement mat may include a combination of coarse glass fibers (i.e., glass fibers having diameters between about 8 and 30 µm) and microfibers, or fibers having a fiber diameter of between about 0.01 and 5 µm. These glass mats may include between 40-80% coarse glass fibers and 20-60% glass microfibers. The coarse fibers and/or binder may limit or restrict the exposure of the water and/or water/acid solution to the glass microfibers, which are typically more wettable or wickable than the coarse fibers. The coarse fibers and/or binder may conceal or cover the microfibers, which limits or restricts exposure of the water and/or water/acid solution to the microfibers. The wettable component may increase the exposure of the water and/or water/acid solution to the glass microfibers, such as by providing an avenue to the microfibers, which may aid in the transport of the water and/or water/acid solution to the surface of the reinforcement mat and in evaporation of the water and/or water/acid solution.

In some embodiments, the binder and wettable component may be added to the reinforcement mat up to about 20% LOI (Loss on Ignition). In other embodiments, a first binder that does not include a wettable component may be used to bond the coarse glass fibers and/or glass microfibers, and a second binder having the wettable component (e.g., a hydrophilic functional group) may be applied to the reinforcement mat to increase the wettability of the mat. The first and second binders may be mixed or combined together to form a single binder mixture that is applied to the coarse glass fibers and/or glass microfibers.

In another embodiment, the added wetting component may be a fiber that reacts with the acid solution (e.g., sulfuric acid) of the battery so that the fiber dissolves upon exposure to the acid solution. The fiber may be a natural fiber, such as cellulose (hereinafter component fibers). The component fibers may have a microfiber structure, or in other words may have fiber diameters between about 0.01 and 5 μm. The wickability/wettability of the component fibers may be better than the glass fibers (e.g., coarse fibers in the range of 8-30 μm) due to the structure of the fibers (e.g., microfibers) and/or because the component fibers typically include hydrophilic functional groups, such as OH groups, COOH groups, and the like.

In some embodiments, the component fibers may be formed into a mat that is separate from the mat of glass fibers, such as by applying the component fibers atop a glass fiber mat. The component fiber mat may be bonded with the glass fiber mat so that the resulting combined mat has essentially two layers—a layer of glass fibers and a layer of component fibers. In some embodiments, a second component fiber mat may be bonded to an opposite side of the glass fiber mat so that the resulting combined mat has essentially three layers—a glass mat sandwiched between two component fiber mats. In another embodiment, the component fibers may be mixed with the glass fibers so that the resulting mat includes a combination of entangled glass fibers and component fibers. An acid resistant binder may be used to bond the component fiber mat with the glass fiber mat, or may be used to bond the entangled glass fibers and component fibers to form the reinforcement mat.

In one embodiment, the glass fiber mat may include mainly coarse fibers, or fibers having a fiber diameter of between about 5 and 30 μm. In some embodiments, other acid resistant fibers may be used instead of glass including polyethylene fibers, polypropylene fibers, polyester fibers, and the like. The component fibers (e.g. cellulose fibers) provide the reinforcement mat with good wetting properties by aiding in the transport of water and or a water/acid solution to the surface of the reinforcement mat where the water and/or water/acid solution may evaporate. As described above, the component fibers may be dissolvable by the acid in the solution (e.g. sulfuric acid) such that a significant amount of the mat's mass is lost after the component fibers dissolve. In some embodiments, the reinforcement mat may include between about 15-85% of the coarse fibers and between about 15-85% of the component fibers. The component fibers may be exposed to a solution containing between about 15-65% by weight of sulfuric acid, which may cause the component fibers to dissolve. In such embodiments, the mat may lose up to 5-85% of its mass upon dissolving of the component fibers, and more commonly lose between 15-50% of its mass. The coarse fibers used to make the mat are sufficiently strong so as to reinforce the electrode after the component fibers are dissolved.

In another embodiment, the glass fiber mat may include mainly glass microfibers, or fibers having a fiber diameter of between about 0.01 and 5 μm. The resulting reinforcement mat may include mainly or only glass microfibers that are entangled with the components fibers, or that are bonded with a component fiber mat(s). Such a reinforcement mat may have exceptional wetting and wicking capabilities. The component fibers may dissolve when exposed to the acid solution such that the glass microfibers remain adjacent the electrode subsequent to dissolving of the component fibers.

In some embodiments, the reinforcement mat may include a combination of coarse acid resistant fibers (e.g., fibers having a fiber diameter of between 5 and 30 μm), acid resistant microfibers (e.g., fibers having a fiber diameter of between 0.01 and 5 μm), and the component fibers. The acid resistant coarse fibers and microfibers are commonly glass fibers, although other acid resistant fibers may be used. In some embodiments, the reinforcement mat may include between about 15-85% of the combination of glass coarse and microfibers, and between about 15-85% of the component fibers. In another embodiment, the reinforcement mat may include between about 40-60% of the coarse glass fibers, 20-30% of the glass microfibers, and 20-30% of the component fibers. The component fibers and microfibers may function synergistically to wick water and/or the water/acid solution, and thus, may greatly improve the wettability/wickability of the reinforcement mat. For example, glass microfibers are typically more wettable than coarse glass fibers. The microfibers, however, may be covered or concealed by the coarse glass fibers and/or binder and, thus, not exposed to the water and/or water/acid solution.

The addition of the component fibers within, or adjacent a surface of, the reinforcement mat may greatly improve the exposure of the water and/or water/acid solution to the glass microfibers, thereby enabling the water and/or water/acid solution to access the glass microfibers and be wicked or transported to a surface of the mat for evaporation. In this manner, the microfibers and component fibers function synergistically to wick or transport the water and/or water/acid solution for eventual evaporation. The addition of the glass microfibers to a reinforcement mat that includes the coarse and component fibers may greatly increase the wettability/wickability of the reinforcement mat.

In some embodiments, the binder having the wettable component (e.g., a hydrophilic functional group) may be used to bond a reinforcement mat that includes the coarse glass and component fibers, or that includes the coarse glass fibers, glass microfibers, and component fibers. The wettable component may further increase the wettability of the reinforcement mats, such as by providing another avenue for transport of the water and/or water/acid solution and/or by increasing the exposure of the water and/or water/acid solution to the glass microfibers.

In another embodiment, the added wetting component may be a wettable solution that is added to the reinforcement mat. The wettable solution may be added to the reinforcement mat so as to saturate the reinforcement mat, or so as to be disposed on at least one surface of the reinforcement mat after drying of the wettable solution. The wettable solution may include a starch solution, cellulose solution, polyvinyl alcohol solution, polyacrylic acid solution, and the like. The wettable solution may be added to the mat after the mat is formed, such as by dip-coating the reinforcement mat in the wettable solution, or by applying the wettable solution via spray coating, curtain coating, and the like. After application of the wettable solution, the wettable solution may be dried to provide an avenue for the water and/or water/acid solution to evaporate. The wettable solution may subsequently dissolve when exposed to an acid environment, such as the environment of the battery's electrode, so that the reinforcement mat remains adjacent the electrode after dissolving of the wettable solution.

According to any of the embodiments described herein, the addition of the wetting component to the reinforcement mat may increase the wettability of the reinforcement mat such that the reinforcement mat exhibits an average water wick height of at least 0.5 cm after exposure to water for 10 minutes. The test to determine the average water wick height of the reinforcement mat may be conducted according to method ISO8787. Similarly, the addition of the wetting component to the reinforcement mat may enable the reinforcement mat to exhibit an average water/acid solution wick height of at least 0.5 cm after exposure to the water/acid solution for 10 minutes. This test is similarly conducted according to method ISO8787. In other embodiments, the average water wick height and/or water/acid solution wick height may be at least 0.8 cm after exposure to the respective solution for 10 minutes. In yet other embodiments, the average water wick height and or water/acid solution wick height may be greater than 1 cm after exposure to the respective solution for 10 min. As briefly described above, the addition of glass microfibers to the reinforcement mat may significantly increase the wettability/wickability of the reinforcement mat such that the average water wick height and/or water/acid solution wick height increases.

Embodiments

Figure 1:
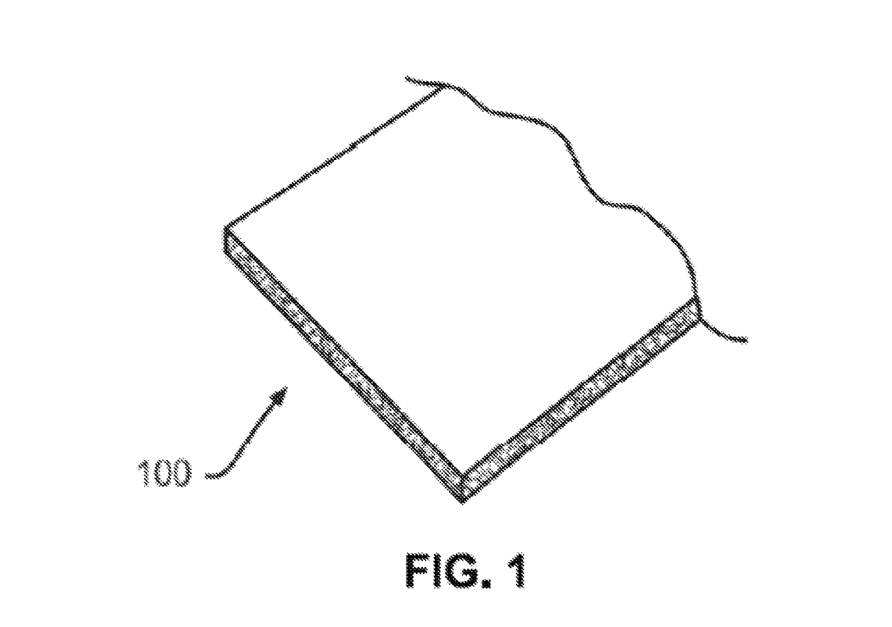
FIG. 1 illustrates a nonwoven fiber mat for reinforcing a plate or electrode of a lead-acid battery, according to an embodiment.

Referring now to FIG. 1, illustrated is an embodiment of a nonwoven fiber mat 100 for reinforcing a plate or electrode of a lead-acid battery (hereinafter reinforcement mat 100). The reinforcement mat 100 includes a plurality of glass fibers that may be either coarse fibers (e.g., fibers having a diameter between about 5-30 μm), microfibers (e.g., fibers having a diameter between about 0.01-5 μm), or a combination of coarse and microfibers as described herein. Reinforcement mat 100 also includes an acid resistant binder that couples the plurality of glass fibers together to form the mat. The reinforcement mat 100 further includes a wetting component that is applied to reinforcement mat 100 to increase the wettability/wickability of the reinforcement mat. The wettability/wickability of the reinforcement mat 100 may be increased such that the reinforcement mat has or exhibits an average water wick height and/or water/acid solution wick height of at least 0.5 cm after exposure to the respective solution for 10 minutes in accordance with a test conducted according to method ISO8787. As described previously, the wetting component is dissolvable in an acid solution of the lead-acid battery such that a significant portion of the reinforcement mat 100 is lost due to this dissolving of the wetting component. In one embodiment, the reinforcement mat 100 may lose between about 5-85% of its mass due to dissolving of the wetting component, and more commonly lose between 15-50% of its mass.

As described herein, in some embodiments the wetting component may be wettable component of the acid resistant binder (e.g., a hydrophilic functional group) or a hydrophilic binder that is mixed/combined with the acid resistant binder. In other embodiments, the wetting component may be a wettable solution (e.g. starch or cellulose solution) that is applied to the reinforcement mat 100 so that the wettable solution saturates the reinforcement mat 100 or is disposed on at least one surface of the reinforcement mat 100 after the wettable solution is dried. In still another embodiment, the wetting component may be a plurality of component fibers (e.g., cellulose or other natural fibers) that are bonded with the reinforcement mat 100. According to one embodiment, the component fibers may form a component fiber mat that is bonded to at least one side of the reinforcement mat 100 such that the reinforcement mat 100 comprises a two layer mat configuration. In another embodiment, the component fibers may be mixed with the glass fibers such that upon forming the reinforcement mat 100 and component fibers are entangled with and bonded to the glass fibers. In yet other embodiments, the wetting component may be a combination of the above described wetting components (i.e., a binder having a wettable component, a wettable solution, and/or a component fiber).

In a specific embodiment, reinforcement mat 100 includes a plurality of first glass fibers having fiber diameters between about 5-30 μm and a plurality of second glass fibers having fiber diameters between about 0.01-5 μm. The addition of the second glass fibers may significantly increase the wettability/wickability of the reinforcement mat 100 such that the reinforcement mat 100 has or exhibits an average water wick height and/or average water/acid solution wick height of at least 1.0 cm after exposure to the respective solution for 10 minutes in accordance with a test conducted according to method ISO8787. In some embodiments, reinforcement mat 100 has a thickness of between 0.1 and 1 mm under 10 KPa pressure.

Figure 2:
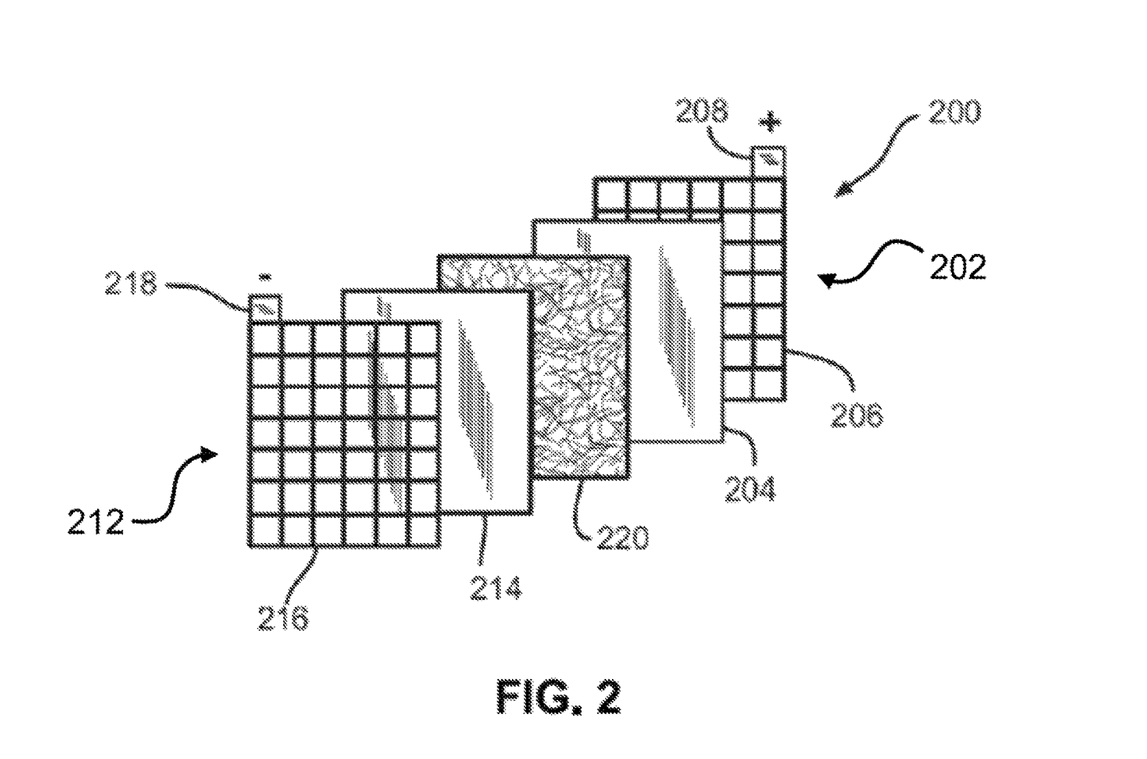
FIG. 2 illustrates a front exploded view of a lead-acid battery cell, according to an embodiment.

Referring now to FIG. 2, illustrated is front exploded view of a lead-acid battery cell 200. The lead-acid batter cell 200 may represent a cell used in either flooded lead-acid batteries or Absorptive Glass Mat (AGM) batteries. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 includes a positive plate or electrode 202 and a negative plate or electrode 212 separated by battery separator 220. Positive electrode 202 includes a grid or conductor 206 of lead alloy material. A positive active material (not shown), such as lead dioxide, is typically coated or pasted on grid 206. Grid 206 is also electrically coupled with a positive terminal 208. A reinforcement mat 204, such as those described herein, is coupled with grid 206 and the positive active material. Reinforcement mat 204 provides structural support for the grid 206 and positive active material.

Similarly, negative electrode 212 includes a grid or conductor 216 of lead alloy material that is coated or pasted with a negative active material (not shown), such as lead. Grid 216 is electrically coupled with a negative terminal 218. A reinforcement mat 214, such as those described herein, is also coupled with grid 216 and the negative active material. Reinforcement mat 214 provides structural support for the grid 216 and negative active material. In flooded type lead-acid batteries, positive electrode 202 and negative electrode 212 are immersed in an electrolyte (not shown) that may include a sulfuric acid and water solution. In AGM type lead-acid batteries, the electrolyte is absorbed and maintained within battery separator 220. Battery separator 220 is positioned between positive electrode 202 and negative electrode 212 to physically separate the two electrodes while enabling ionic transport, thus completing a circuit and allowing an electronic current to flow between positive terminal 208 and negative terminal 218. Separator 220 typically also includes a microporous membrane, which is often a polymeric film having negligible conductance. The polymeric film may include micro-sized voids that allow ionic transport (i.e., transport of ionic charge carriers) across separator 220.

As described herein, reinforcement mat 204 and/or 214 includes a plurality of glass fibers, an acid resistant binder that couples the plurality of glass fibers together to form the reinforcement mat. The reinforcement mat 204 and/or 214 also includes a wetting component that is applied to the reinforcement mat to increase the wettability/wickability of the reinforcement mat. The wettability/wickability of the reinforcement mat 204 and/or 214 is increased so that the reinforcement mat has or exhibits an average water wick height and/or average water/solution wick height of at least 0.5 cm after exposure to the respective solution for 10 minutes in accordance with a test conducted according to method ISO8787. The wetting component is dissolvable in an acid solution of cell 200 such that a significant portion of the reinforcement mat 204 and/or 214 is lost due to dissolving of the wetting component as described herein.

As described herein, the wetting component may be a wettable component of the acid resistant binder (e.g., a hydrophilic functional group), a hydrophilic binder that is mixed with the acid resistant binder, the wetting component may be component fibers (e.g., cellulose or natural fibers) that are bonded with the glass fibers of the reinforcement mat 204 and/or 214, or the wetting component may be a wettable solution (e.g., starch or cellulose solution) that is applied to the reinforcement mat 204 and/or 214 such that the wettable solution saturates the reinforcement mat 204 and/or 214 or is disposed on at least one surface of the reinforcement mat 204 and/or 214 upon drying of the wettable solution. In some embodiments, the wetting component may include a combination of any of the aforementioned components, such as a combination of cellulose fibers and an acid resistant binder having a wettable component. In a specific embodiment, the glass fibers of reinforcement mat 204 and/or 214 include first fibers having fiber diameters between about 6 μm and about 30 μm, or 8 μm and about 30, μm and second fibers having fiber diameters between 0.01 μm and 5 μm.

Figure 4:
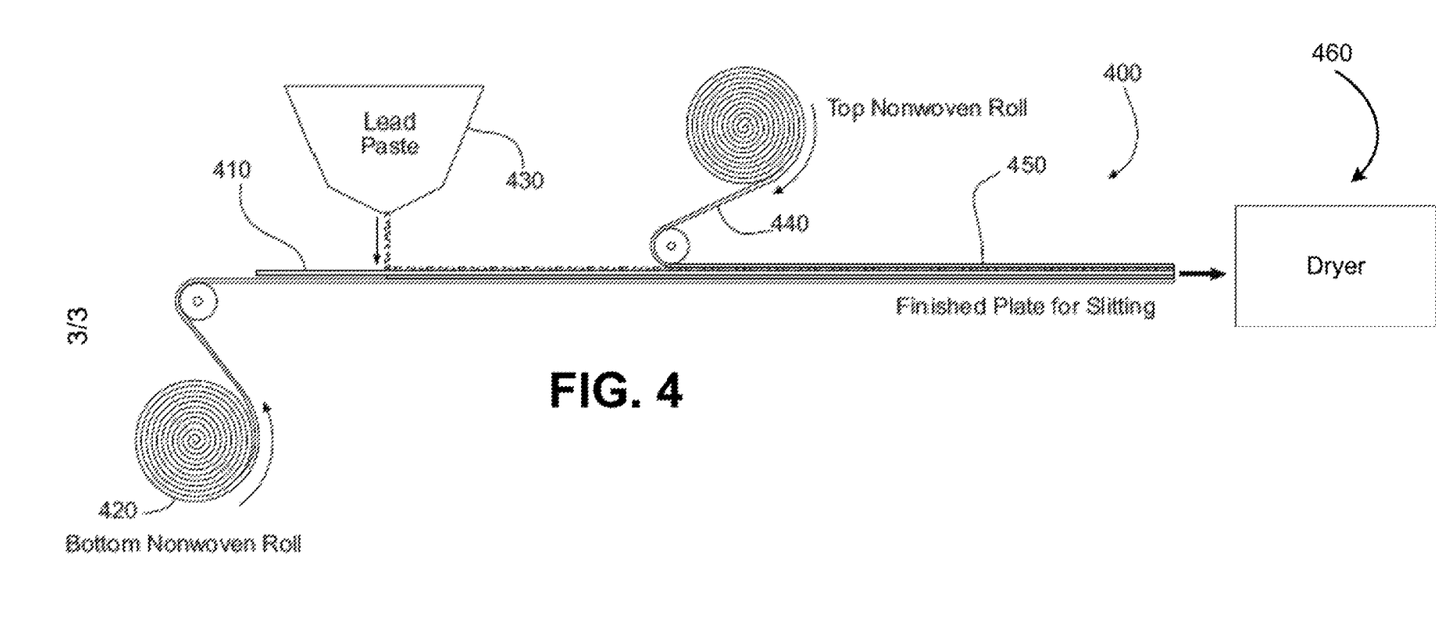
FIG. 4 illustrates a process for manufacturing an electrode for a lead-acid battery, according to an embodiment.

Referring now to FIG. 4, illustrated is a process 400 for manufacturing an electrode for a lead-acid battery, such as a flooded type lead-acid battery and/or AGM battery. The process may involve transporting a lead alloy grid 410 on a conveyor toward an active material 430 applicator (e.g., lead or lead oxide paste applicator), which applies or pastes a slurry of the active material 430 to the grid 410. The slurry of the active material may have a relatively high water and/or water/acid solution content that needs to be dried or removed at some point during the manufacture of the electrode. A reinforcement mat roll 420 may be positioned below grid 410 so that a reinforcement mat is applied to a bottom surface of the grid 410. The reinforcement mat may include the glass fibers and wetting component as described herein. In some embodiments, the reinforcement mat may also include a blend of coarse and micro glass fibers in addition to the wetting component as described herein. In some embodiments, a second reinforcement mat roll 440 may be positioned above grid 410 so that a second reinforcement mat is applied to a top surface of the grid 410. The second reinforcement mat may also include the glass fibers and wetting component and/or a blend of coarse and micro glass fibers in addition to the wetting component as described herein. The second reinforcement mat may be similar to or different from the first reinforcement mat.

The resulting electrode or plate 450 may subsequently be cut to length via a plate cutter (not shown). The active material 430 may be applied to the grid 410 and/or top and bottom of reinforcement mats, 440 and 420, so that the active material impregnates or saturates the reinforcement mats to some degree. The electrode or plate 450 may then be dried via a dryer 460 or other component of process 400. As described herein, the reinforcement mats, 440 and 420, may aid in the drying of the electrode or plate 450 by wicking the water and/or water/acid solution from the electrode or plate 450 so as to allow the water and/or water/acid solution to evaporate.

Figure 3:
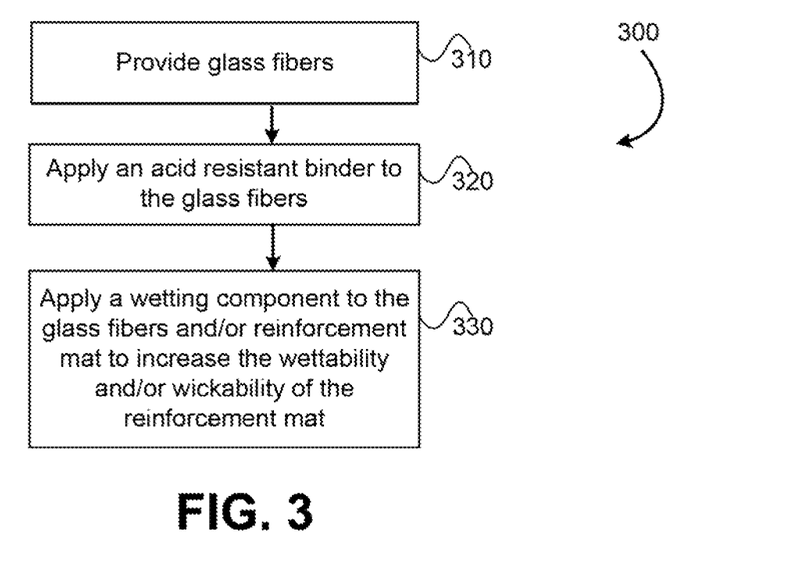
FIG. 3 is a method of manufacturing a nonwoven fiber mat for reinforcing a plate or electrode of a lead-acid battery, according to an embodiment.

Referring now to FIG. 3, illustrated is an embodiment of a method 300 of manufacturing a nonwoven fiber mat for reinforcing a plate or electrode of a lead-acid battery (hereinafter reinforcement mat). At block 310, a plurality of glass fibers are provided. The glass fibers may be coarse fibers, microfibers, or a combination of coarse and microfibers. At block 320, an acid resistant binder is applied to the plurality of glass fibers to couple the plurality of glass fibers together to form the reinforcement mat. At block 330, a wetting component is added to the glass fibers and/or reinforcement mat to increase the wettability/wickability of the reinforcement mat. As described herein, the wettability/wickability of the reinforcement mat may be increased such that the reinforcement mat has or exhibits an average water wick height and/or average water/acid solution wick height of at least 0.5 cm after exposure to the respective solution for 10 minutes in accordance with the test conducted according to method ISO8787.

In some embodiments, method 300 may further include exposing the reinforcement mat to an acid solution to dissolve the wetting component. For example, after the components of the battery are assembled (e.g., the separator, electrodes/plates, battery case, and the like), an acid electrolyte solution is introduced into the battery's interior and the battery is closed and/or sealed. Exposure of the reinforcement mat to the acidic electrolyte solution may dissolves the wetting component. Dissolving of the wetting component may result in a significant portion of the reinforcement mat being lost or eliminated as described herein. For example, in some embodiments between about 15-85% of the mass of the reinforcement mat may be lost due to dissolving of the wetting component in the acid solution. In some embodiments, the reinforcement mat may be exposed to between 15-65% by weight of the acid solution.

In some embodiments, applying the wetting component includes applying the acid resistant binder, where the acid resistant binder includes a wettable component (e.g., a hydrophilic functional group, a hydrophilic and acid resistant binder mixture, and the like) that functions to increase the wettability/wickability of the nonwoven fiber mat. In another embodiment, applying the wetting component includes applying a wettable solution (e.g., starch or cellulose solution and the like) to the reinforcement mat such that the wettable solution saturates the reinforcement mat or is disposed on at least one surface of the reinforcement mat upon drying of the wettable solution.

In yet another embodiment, applying the wetting component includes bonding a plurality of component fibers (e.g., cellulose fibers and the like) with the plurality of glass fibers of the reinforcement mat. In such embodiments, the reinforcement mat may include between about 40-95% of the glass fibers and 5-50% of the cellulose fibers, and more commonly between about 10-30% of the cellulose fibers. In a specific embodiment, the reinforcement mat may include between about 40-60% of the glass fibers and 40-60% of the cellulose fibers. In still further embodiments, applying the wetting component may include applying any combination of the wetting components described herein, such as the component fibers, wettable solution, and/or acid resistant binder having a wettable component.

In some embodiments, the plurality of glass fibers may include first glass fibers having fiber diameters between about 8 μm and about 30 μm. In such embodiments, the method 300 may further include providing a plurality of second glass fibers having fiber diameters between about 0.01 µm and about 5 µm and bonding the plurality of second glass fibers with the first glass fibers via the acid resistant binder. The addition of the second glass fibers may increase the wettability/wickability of the reinforcement mat such that the reinforcement mat has or exhibits an average water wick height and/or an average water/acid solution wick height of at least 1.0 cm after exposure to the respective solution for 10 minutes in accordance with the test conducted according to method ISO8787. In some embodiments, component fibers (e.g., cellulose fibers and the like) may be bonded with the plurality of first glass fibers and the plurality of second glass fibers. In such embodiments, the reinforcement mat may include between about 40-80% of the first glass fibers, 10-50% of the second glass fibers, and 5-40% of the cellulose fibers. In another embodiment, the reinforcement mat may include between about 40-50% of the first glass fibers, 20-30% of the second glass fibers, and 20-30% of the cellulose fibers.

Examples

Several reinforcement mats were manufactured in accordance with the embodiments described herein and tested to determine the wettability/wickability of the mats. The wettability/wickability tests were conducted according to method ISO8787. The mats were exposed to both a water solution and a water/acid solution where the concentration of sulfuric acid was approximately 40%. The results of the tests are shown in Table 1 below.

TABLE 1

Sample Reinforcement Mat

| Sample ID | Sample description | Binder | Average water wicking height after 10 mins (cm) | Std Dev | Average acid wicking (40%) height after 10 mins (cm) | Std Dev |
|---|---|---|---|---|---|---|
| Control | 100% coarse glass fibers | RHOPLEX ™ HA-16 | 0.0 | 0 | 0.0 | 0.0 |
| 1 | 50% ¾" K249 T, 50% cellulose | RHOPLEX ™ HA-16 | 0.8 | 0.15 | 1.2 | 0.12 |
| 2 | 50% ¾" K249 T, 50% cellulose | Hycar ® FF 26903 | 0.9 | 0.15 | 0.9 | 0.15 |
| 3 | 50% ¾" K249 T, 25% cellulose, 25% 206-253 | Hycar ® FF 26903 | 2.7 | 0.05 | 1.9 | 0.25 |

A control mat was also manufactured and tested to provide a comparison or reference point for the other tested mats. The control mat includes 100% coarse glass fibers (T glass fibers) having an average fiber length of approximately ¾" and an average fiber diameter of approximately 13 µm. The glass fibers were bond together with an acid resistant binder sold by Dow Chemical under the trade name RHOPLEX™ HA-16. The acid resistant binder was applied so as to have a Loss on Ignition (LOI) of approximately 20%. The control mat exhibited an average water wicking height and an average acid wicking height of approximately 0.0 cm after exposure to the respective solutions for 10 minutes. Stated differently, the control mat exhibited essentially no wettability/wickability.

A first mat (i.e. Sample ID 1) was manufactured to include approximately 50% coarse glass fibers having an average fiber length of approximately ¾" and an average fiber diameter of approximately 13 µm and to include 50% cellulose fibers having an average fiber length of approximately 2.40 mm. The cellulose fibers were made from a pulp slurry by pre-soaking a Kraft board in water (e.g., Kamloops Chinook Kraft board manufacture by Domtar) and stirring the soaked Kraft board in water for at least 10 minutes. The cellulose fiber pulp slurry was then combined with the glass fibers. The coarse glass fibers and cellulose fibers were bond together with the RHOPLEX™ binder so as to have an LOI of approximately 20%. The first mat exhibited an average water wicking height of approximately 0.8 cm with a standard deviation of 0.15 after exposure to the water solution for 10 minutes. The first mat also exhibited an average water/acid solution wicking height of approximately 1.2 cm with a standard deviation of 0.12 after exposure to the water/acid solution for 10 min.

A second mat (i.e. Sample ID 2) was manufactured to include approximately 50% coarse glass fibers and 50% cellulose fibers having fiber properties similar to the first mat. The coarse glass fibers and cellulose fibers were bond together with an acid resistant binder sold by Lubrizol under the trade name Hycar® FF 26903. The binder was applied so as to have an LOI of approximately 20%. The second mat exhibited an average water wicking height of approximately 0.9 cm with a standard deviation of 0.15 after exposure to the water solution for 10 minutes. The second mat also exhibited an average water/acid solution wicking height of approximately 0.9 cm with a standard deviation of 0.15 after exposure to the water/acid solution for 10 min.

A third mat (i.e. Sample ID 3) was manufactured to include approximately 50% coarse glass fibers and 25% cellulose fibers having fiber properties similar to the first and second mats. The third mat also included approximately 25% glass microfibers having an average fiber diameter of approximately 0.76 µm (i.e., Johns Manville 206-253 fibers). The coarse glass fibers, glass microfibers, and cellulose fibers were bond together with the Hycar® binder so as to have an LOI of approximately 20%. The third mat exhibited an average water wicking height of approximately 2.7 cm with a standard deviation of 0.05 after exposure to the water solution for 10 minutes. The third mat also exhibited an average water/acid solution wicking height of approximately 1.9 cm with a standard deviation of 0.25 after exposure to the water/acid solution for 10 min.

As shown in the test results above, the addition of the wetting component to the reinforcement mat, which in this case included cellulose fibers, significantly increased the wettability/wickability of the reinforcement mat. Further, the inclusion of glass microfibers in the reinforcement mat in addition to the wetting component significantly increased the wettability/wickability of the reinforcement mat beyond that exhibited by adding the wetting component alone.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of manufacturing a nonwoven fiber mat for reinforcing a plate or electrode of a lead-acid battery, the method comprising:
    providing a plurality of glass fibers;
    applying a binder mixture to the plurality of glass fibers to couple the plurality of glass fibers together to form the nonwoven fiber mat so as to exhibit a loss on ignition (LOI) of up to about 20%, the binder mixture comprising an acid resistant binder that bonds the plurality of glass fibers and a poly acrylic acid based binder that increases the wettability of the nonwoven fiber mat such that the nonwoven fiber mat has or exhibits an average water wick height of at least 0.5 cm after exposure to water for 10 minutes conducted according to method ISO8787; and
    exposing the nonwoven fiber mat to an acid solution to dissolve at least some of the poly acrylic acid based binder, wherein a portion of the nonwoven fiber mat is lost due to dissolving of the at least some of the poly acrylic acid based binder.

2. The method of claim 1, wherein the portion of the nonwoven fiber mat that is lost due to dissolving of the at least some of the poly acrylic acid based binder comprises between about 5-85% of the mass of the nonwoven fiber mat.

3. The method of claim 1, wherein the nonwoven fiber mat is exposed to between 15-65% by weight of the acid solution.

4. The method of claim 1, wherein the acid resistant binder includes a hydrophilic functional group that functions as a wetting component to increase the wettability of the nonwoven fiber mat.

5. The method of claim 1, further comprising bonding a plurality of cellulose fibers with the plurality of glass fibers of the nonwoven fiber mat.

6. The method of claim 5, wherein the nonwoven fiber mat comprises between about 40-60% of the glass fibers and 40-60% of the cellulose fibers.

7. The method of claim 1, further comprising applying a starch solution to the nonwoven fiber mat such that the starch solution saturates the nonwoven fiber mat or is disposed on at least one surface of the nonwoven fiber mat.

8. The method of claim 1, wherein the plurality of glass fibers comprise first glass fibers having fiber diameters between about 8 μm and about 30 μm and wherein the method further comprises:
    providing a plurality of second glass fibers having fiber diameters between about 0.01 μm and about 5 μm; and
    bonding the plurality of second glass fibers with the first glass fibers via the acid resistant binder, wherein the addition of the second glass fibers increases the wettability of the nonwoven fiber mat such that the nonwoven fiber mat has or exhibits an average water wick height of at least 1.0 cm after exposure to water for 10 minutes conducted according to method 1808787.

9. The method of claim 8, further comprising bonding cellulose fibers with the first glass fibers and the plurality of second glass fibers, and wherein the nonwoven fiber mat comprises between about 40-80% of the first glass fibers, 10-50% of the second glass fibers, and 5-40% of the cellulose fibers.

* * * * *